United States Patent [19]
Fluch et al.

[11] Patent Number: 5,871,560
[45] Date of Patent: Feb. 16, 1999

[54] PROCESS AND PLANT FOR THE DIRECT REDUCTION OF IRON-OXIDE-CONTAINING MATERIALS

[75] Inventors: Roland Fluch, Gallneukirchen; Karl Czermak, Enns; Günter Peer, Gunskirchen, all of Austria; Roy Hubert Whipp, Jr., Miami, Fla.

[73] Assignees: Voest-Alpine Industrieanlagenbau GmbH, Austria; Brifer International Ltd., Barbados

[21] Appl. No.: 765,342

[22] PCT Filed: Jun. 20, 1995

[86] PCT No.: PCT/AT95/00121

§ 371 Date: Jan. 15, 1997

§ 102(e) Date: Jan. 15, 1997

[87] PCT Pub. No.: WO96/00302

PCT Pub. Date: Jan. 4, 1996

[30] Foreign Application Priority Data

Jun. 23, 1994 [AT] Austria ................................ 1248/94

[51] Int. Cl.$^6$ .................................................. C21B 13/00
[52] U.S. Cl. ................................ 75/505; 75/450; 266/78; 266/156; 266/172
[58] Field of Search ..................... 75/505, 450; 266/78, 266/156, 172

[56] References Cited

U.S. PATENT DOCUMENTS

| | | |
|---|---|---|
| 3,936,296 | 2/1976 | Campbell .................................. 75/26 |
| 4,333,761 | 6/1982 | Ahrendt et al. . |
| 4,376,648 | 3/1983 | Ohtawa et al. ........................ 75/498 |
| 5,531,424 | 7/1996 | Whipp .................................... 266/172 |

FOREIGN PATENT DOCUMENTS

| | | |
|---|---|---|
| 571358 | 11/1993 | European Pat. Off. . |
| 2907022 | 8/1980 | Germany . |
| 799551 | 8/1958 | United Kingdom . |

*Primary Examiner*—Melvyn Andrews
*Attorney, Agent, or Firm*—Ostrolenk, Faber, Gerb & Soffen, LLP

[57] ABSTRACT

A direct reduction process is disclosed for iron oxide-containing materials. Synthesis gas is mixed with top gas produced during direct reduction of the iron oxide-containing materials and is used as reduction gas for directly reducing and heating the iron oxide-containing materials up to reduction temperature. In order to set the $H_2S$ content at a predetermined value by a relatively simple technique and with a relatively simple equipment, at least part of the sulphur contained in the iron oxide-containing materials as $H_2S$ produced during heating or direct reduction is added to the reduction gas together with the top gas.

13 Claims, 1 Drawing Sheet

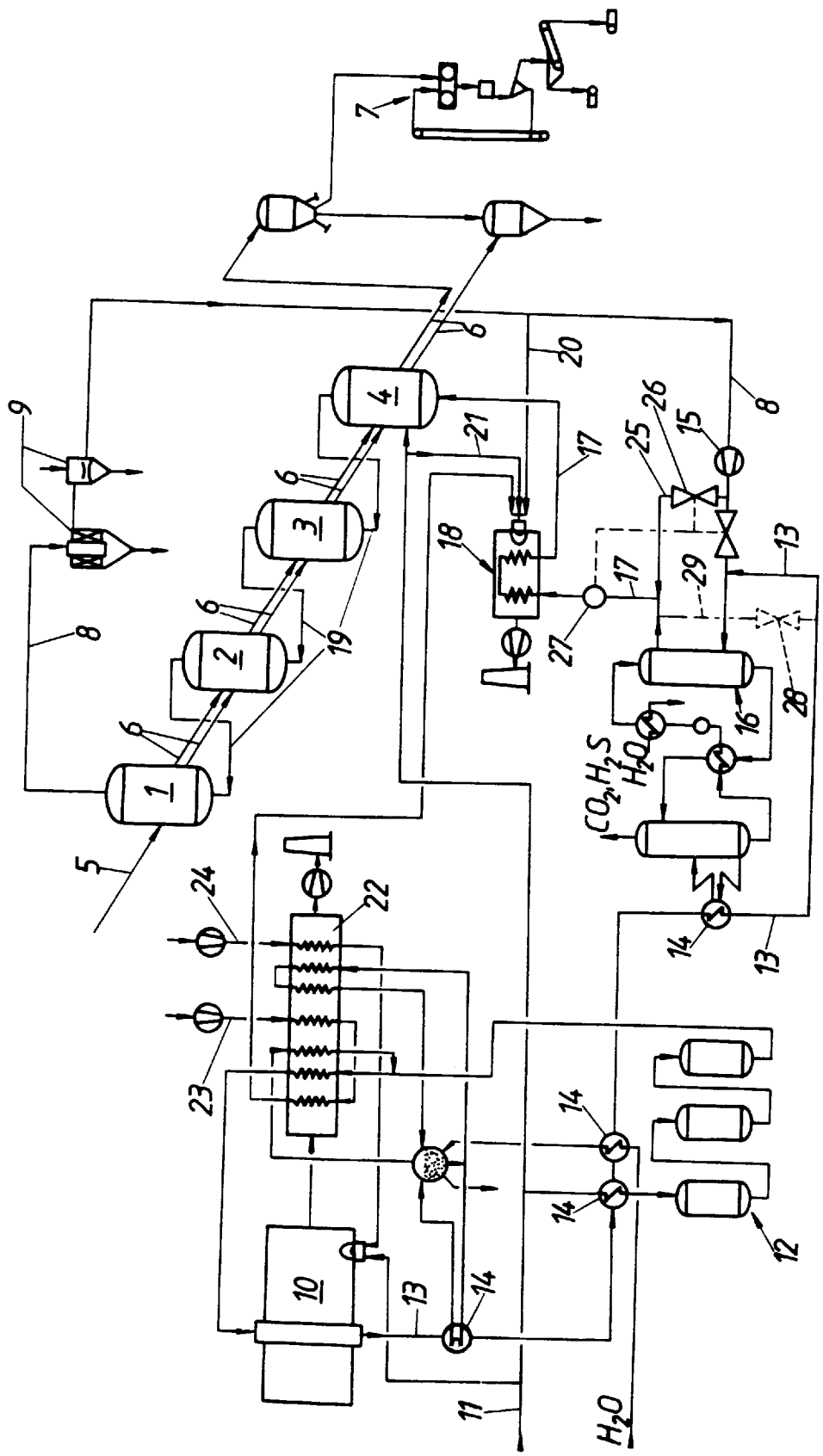

PROCESS AND PLANT FOR THE DIRECT REDUCTION OF IRON-OXIDE-CONTAINING MATERIALS

FIELD OF THE INVENTION

The invention relates to a process for the direct reduction of iron-oxide-containing material, wherein synthesis gas, preferably reformed natural gas, is mixed with top gas forming in the direct reduction of the iron-oxide-containing material and is used as a reducing gas for direct reduction and for heating the iron-oxide-containing material to reduction temperature, as well as a plant for carrying out the process.

DESCRIPTION OF THE RELATED ART

A process of this type is known from EP-A-0 571 358.

Metallic plant parts that get into contact with CO-containing reducing gas are subject to a high stress due to corrosion: The result is metal decomposition, which is denoted as "metal dusting" in the technical literature. Metal dusting occurs to an increased extent at elevated temperatures, plant parts that get into contact with hot reducing gas, thus, being particularly jeopardized. With a plant for carrying out the initially mentioned process, these are primarily the reactors employed for direct reduction and the gas heaters heating the reducing gas to reduction temperature.

To avoid or reduce metal dusting, it is internally known to provide for a content of sulfur within the reducing gas, which has been accomplished by blowing an $H_2S$ gas through tuyeres such an admixture of $H_2S$ gas is not only technologically complex, but also very expensive and, in addition, involves procedural difficulties, i.e., it is difficult to adjust the $H_2S$ content in the reducing gas uniformly to a predetermined value as a function of the chemical composition of the reducing gas.

SUMMARY OF THE INVENTION

The invention aims at avoiding these disadvantages and difficulties and has as its object to provide a process of the initially defined kind and a plant for carrying out the process, which enables the adjustment of the content of $H_2S$ to a predetermined value with sufficient accuracy and by avoiding great procedural and structural expenditures as well as high costs.

In accordance with the invention, this object is achieved in that at least a portion of the sulfur contained in the iron-oxide-containing material, together with the top gas, is fed to the reducing gas in the form of $H_2S$ incurring in heating and in direct reduction, respectively.

The invention is based on the idea to utilize the sulfur usually contained in the ore and which has not been used in further processing so far, taking advantage of the fact that $H_2S$ is formed when heating sulfide ores. According to the invention, this $H_2S$, together with the reducing gas effecting heating and by which it is absorbed, is carried off as a top gas and fed to the reducing gas.

Suitably, a content of $H_2S$ ranging from 20 to 40 ppmV, preferably amounting to about 25 ppmV, is adjusted in the reducing gas by means of the top gas.

According to a preferred embodiment, the top gas is subjected to $CO_2$ scrubbing prior to being used as a reducing gas and the adjustment of the $H_2S$ content in the reducing gas is effected by directly admixing to the reducing gas at least a partial volume of the top gas while avoiding $CO_2$ scrubbing. This variant is particularly simple to realize, because the only thing to be provided is a bypass duct bypassing the $CO_2$ scrubber. Thereby, washing out of the $H_2S$ present in that portion of the top gas is prevented, whereas the remaining portion of the top gas is subjected to $CO_2$ scrubbing, by which also $H_2S$ is washed out. By varying the amount of top gas conducted through the bypass duct, the desired $H_2S$ content of the reducing gas may be adjusted in a simple manner.

Another preferred embodiment is characterized in that reformed natural gas is employed as the synthesis gas and that both the reformed natural gas and the top gas are subjected to $CO_2$ scrubbing prior to being used as a reducing gas, wherein a partial volume of the reformed natural gas is directly admixed to the reducing gas while avoiding $CO_2$ scrubbing. Thereby, any desired $CO_2$ content may be adjusted in a simple manner and changes in the $CO_2$ content and in the $CO/CO_2$ ratio of the reducing gas caused by the direct admixture of a portion of $CO_2$-unscrubbed top gas may be balanced out under consideration of the desired $H_2S$ content.

Another preferred way of adjusting the desired $H_2S$ content in the reducing gas is characterized in that the adjustment of the $H_2S$ content in the reducing gas is effected by varying the wash-out degree of $CO_2$ scrubbing with a view to retaining a portion of the $CO_2$ and hence a portion of the $H_2S$ in the scrubbed gas. This embodiment requires the least structural expenditure possible, i.e., not even the arrangement of a bypass duct, yet it has to be taken into account that all of the gas must be conducted through the $CO_2$ scrubber, which will have to be dimensioned accordingly.

Preferably, a sulfurous material, such as iron pyrite, is added to the particulate iron-oxide-containing material in case it does not contain any sulfur, thus causing the formation of $H_2S$ and its absorption by the reducing gas effecting heating of the iron-oxide-containing material to reduction temperature.

A plant for carrying out the process, comprising at least one direct reduction reactor for receiving the iron-oxide-containing material, heating and reducing the same, a reducing-gas supply duct leading to said direct reduction reactor and a top-gas discharge duct carrying off the direct reduction reactor the top gas forming in direct reduction as well as in heating to reduction temperature, the top-gas discharge duct running into a $CO_2$ scrubber and the reducing gas formed of synthesis gas and of top gas getting into the direct reduction reactor through the reducing-gas supply duct and the reducing-gas supply duct leading from the $CO_2$ scrubber to the direct reduction reactor, is characterized in that the top-gas discharge duct is flow-connected with the reducing-gas supply duct by means of a bypass duct avoiding the $CO_2$ scrubber.

According to a preferred embodiment, a reformer for reforming natural gas and a reformed-gas duct departing from the reformer and joining the top-gas discharge duct are provided for the production of synthesis gas, both the reformed-gas duct and the top-gas discharge duct running into the $CO_2$ scrubber.

Preferably, the reformed-gas duct is flow-connected with the reducing-gas supply duct by means of a bypass duct avoiding the $CO_2$ scrubber.

Suitably, the bypass duct(s) is (are) equipped with a adjustment valve, preferably a control valve, capable of being activated via an $H_2S$ measuring means.

In the following, the invention will be explained in more detail by way of the drawing illustrating a process diagram according to a preferred embodiment.

BRIEF DESCRIPTION OF THE DRAWING

The FIGURE shows the plant according to the invention.

DETAILED DESCRIPTION OF THE INVENTION

This plant comprises four whirl layer reactors 1 to 4 consecutively connected in series, wherein iron-oxide-containing material, such as fine ore, through an ore supply duct 5 is supplied to the first whirl layer reactor 1, in which heating to reduction temperature (or prereduction) takes place, and subsequently is conducted from one whirl layer reactor to another whirl layer reactor via conveying ducts 6. The completely reduced material (sponge iron) is hot-briquetted in a briquetting arrangement 7. If required, the reduced iron is protected from reoxidation during briquetting by an inert gas system not illustrated.

All arabic numerals herein refer back to the FIGURE.

In accordance with the invention, prior to introducing the fine ore into the first whirl layer reactor 1, it is subjected to ore preparation, such as drying and sieving, not illustrated in detail.

Reducing gas is conducted in counterflow to the ore flow from one whirl layer reactor 4 to another whirl layer reactor 3 to 1 and is carried off the last whirl layer reactor 1, viewed in the gas flow direction, as a top gas through a top-gas discharge duct 8 and is cooled and scrubbed in a wet scrubber 9.

The production of reducing gas is effected by reforming in a reformer 10 natural gas fed through a duct 11 and desulfurized in a desulfurization plant 12. The gas leaving the reformer 10 and formed of natural gas and vapor essentially consists of $H_2$, CO, $CH_4$, $H_2O$ and $CO_2$. This reformed natural gas is supplied through a reformed-gas duct 13 to several heat exchangers 14, in which it is cooled, water thus being condensed out of the gas.

The reformed-gas duct 13 runs into the top-gas discharge duct 8 after the top gas has been compressed by means of a compressor 15. The mixed gas thus forming is passed through a $CO_2$ scrubber 16 and is freed from $CO_2$ and also from $H_2S$. It is then available as a reducing gas. This reducing gas, via a reducing-gas supply duct 17, is heated to a reducing-gas temperature of about 800° C. in a gas heater 18 arranged to follow the $CO_2$ scrubber 16 and is fed to the first whirl layer reactor 4, viewed in the gas flow direction, where it reacts with the fine ores to produce directly reduced iron. The whirl layer reactors 4 to 1 are arranged in series; the reducing gas gets from one whirl layer reactor to another whirl layer reactor through connection ducts 19.

A portion of the top gas is sluiced out of the gas circulatory system 8, 17, 19 in order to avoid enrichment of inert gases, such as $N_2$. The sluiced-out top gas is fed through a branch duct 20 to the gas heater 18 for heating the reducing gas and is burnt there. Possible shortages of energy are supplemented by natural gas supplied through a feed duct 21.

The sensible heat of the reformed natural gas emerging from the reformer 10 as well as of the reformer smoke gases is utilized in a recuperator 22 to preheat the natural gas after passage through the desulfurization plant 12, to produce the vapor required for reformation and to preheat the combustion air supplied to the gas heater 18 through duct 23 as well as, if desired, also the reducing gas. The combustion air supplied to the reformer through duct 24 is preheated as well.

The top gas leaving the whirl layer reactor 1 has an $H_2S$ content ranging between 40 and 140 ppmV-depending on the sulfur content of the ore. The $H_2S$ gas forms during heating of the fine ore to reduction temperature or during the prereduction of the fine ore, respectively.

According to the invention, $H_2S$ no longer is completely washed out of the top gas by means of the $CO_2$ scrubber, but it is taken care that the percentage of $H_2S$ desired for the reducing gas be fed to the reducing gas from the top gas. On the one hand, this can be realized by means of a bypass duct 25 bypassing the $CO_2$ scrubber 16, which bypass duct departs from the top-gas discharge duct 8 via an adjustment or control valve 26 and runs into the reducing-gas supply duct 17. The adjustment or control valve 26 is adjustable in a manner that an $H_2S$ content ranging between 20 and 40 ppmV, preferably amounting to about 25 ppmV, is $H_2S$ present in the reducing gas. Preferably, the adjustment or control valve 26 is activated via an $H_2S$ measuring means 27.

The desired $H_2S$ content in the reducing gas may be adjusted also by passing the total top gas through the $CO_2$ scrubber 16, yet adjusting the latter to a wash-out level at which a portion of the $CO_2$ and hence also a portion of the $H_2S$ will remain in the gas emerging from the $CO_2$ scrubber 16. This has the advantage that no auxiliary means, such as a bypass duct 25 including a control valve 26, need be provided, yet requires the total gas amount, i.e. all of the top gas and all of the reformed natural gas, to be passed through the $CO_2$ scrubber 16, the latter, thus, having to be dimensioned for such an amount.

To adjust a desired $CO_2$ content or a desired $CO/CO_2$ ratio, respectively, which is influenced by a change in the wash-out level of the $CO_2$ scrubber 16 or by the direct feeding of a portion of the top gas through the bypass duct 25, a portion of the reformed natural gas may be supplied to the reducing-gas supply duct 17 through a bypass duct 29 bypassing the $CO_2$ scrubber 16 and likewise equipped with an adjustable valve 28; that bypass duct 29 will then depart from the reformed gas duct 13. The measures pointed out above for adjusting a desired $H_2S$ content in the reducing gas may be realized individually or also jointly.

The adjustment of $H_2S$ to 25 ppmV is going to be explained by way of the following example:

100 t/h of dried fine ore are charged into a plant for the direct reduction of fine ore configured in accordance with the drawing and designed for a production of 70 t/h of sponge iron. The fine ore has the following analysis:

| | |
|---|---|
| Hematite | 94.2% |
| Gangue | 2.2% |
| Sulfur | 0.02% |

From the top gas forming in the direct reduction, 78,000 $Nm^3/h$ are mixed with 48,000 $Nm^3/h$ of reformed natural gas and passed through the $CO_2$ scrubber 16, in which the mixed gas is freed from $CO_2$ and the major portion of sulfur.

The reformed natural gas and the top gas have the chemical compositions indicated in the Table below.

| | Reformed Natural Gas | Top Gas |
|---|---|---|
| $CH_4$ | 2.80 | 30.60 |
| CO | 4.80 | 5.80 |
| $CO_2$ | 14.50 | 5.30 |
| $H_2$ | 64.40 | 53.00 |

|                  | Reformed Natural Gas | Top Gas    |
|------------------|----------------------|------------|
| $H_2O$           | 13.50                | 0.70       |
| $N_2$            | 0.0                  | 4.60       |
| $H_2S$           | 0.0                  | 60.0 ppmV  |

The gas mixture emerging from the $CO_2$ scrubber 16 and formed of the scrubbed reformed natural gas and of the scrubbed top gas has the following composition:

| | |
|---|---|
| $CH_4$ | 22.80 |
| CO | 6.15 |
| $CO_2$ | 0.80 |
| $H_2$ | 64.90 |
| $H_2O$ | 2.10 |
| $N_2$ | 3.25 |
| $H_{2S}$ | 2 ppmV |

This gas mixture is mixed with 78,000 $Nm^3/h$ of top gas that has not been passed through the $CO_2$ scrubber 16. This gas mixture forms the reducing gas fed to the gas heater 18 and subsequently to the whirl layer reactors 1 to 4 and having the following composition:

| Reducing Gas | |
|---|---|
| $CH_4$ | 24.50 |
| CO | 6.0 |
| $CO_2$ | 3.6 |
| $H_2$ | 60.90 |
| $H_2O$ | 1.5 |
| $N_2$ | 3.5 |
| $H_2S$ | 25 ppmV |

The degree of metallization of the sponge iron is 92%.

According to the following example, a content of $H_2S$ of 35 ppmV is obtained:

100 t/h of dried fine ore are charged into a plant for the direct reduction of fine ore configured in accordance with the drawing and designed for a production of 70 t/h of sponge iron. The fine ore has the following analysis:

| | |
|---|---|
| Hematite | 94.2% |
| Gangue | 2.2% |
| Sulfur | 0.02% |

From the top gas forming in the direct reduction, 63,000 $Nm^3/h$ are mixed with 54,000 $Nm^3/h$ of reformed natural gas and passed through the $CO_2$ scrubber 16, in which the mixed gas is freed from $CO_2$ and the major portion of sulfur.

The reformed natural gas and the top gas have the chemical compositions indicated in the Table below.

|        | Reformed Natural Gas | Top Gas    |
|--------|----------------------|------------|
| $CH_4$ | 2.80                 | 30.75      |
| CO     | 4.80                 | 5.60       |
| $CO_2$ | 14.50                | 5.10       |
| $H_2$  | 64.40                | 53.25      |
| $H_2O$ | 13.50                | 0.70       |
| $N_2$  | 0.0                  | 4.60       |
| $H_2S$ | 0.0                  | 73.0 ppmV  |

The gas mixture emerging from the $CO_2$ scrubber 16 and formed of the scrubbed reformed natural gas and of the top gas has the following composition:

| | |
|---|---|
| $CH_4$ | 20.60 |
| CO | 6.00 |
| $CO_2$ | 0.80 |
| $H_2$ | 67.50 |
| $H_2O$ | 2.20 |
| $N_2$ | 2.90 |
| $H_2S$ | 2 ppmV |

This gas mixture is mixed with 94,000 $Nm^3/h$ of top gas that has not been passed through the $CO_2$ scrubber 16. This gas mixture forms the reducing gas fed to the gas heater 18 and subsequently to the whirl layer reactors 1 to 4 and has the following composition:

| Reducing Gas | |
|---|---|
| $CH_4$ | 24.60 |
| CO | 5.8 |
| $CO_2$ | 3.4 |
| $H_2$ | 61.20 |
| $H_2O$ | 1.4 |
| $N_2$ | 3.6 |
| $H_2S$ | 35 ppmV |

The degree of metallization of the sponge iron is 92%.

The invention is not limited to the above-described examples, but is applicable also to other direct reduction processes, for instance, such in which the whirl layer reactors 1 to 4 are replaced with shaft furnaces for lumpy ore. The reformed natural gas also may be replaced with other reducing gases primarily containing CO and $H_2$, such as LD offgas EAF offgas blast furnace gas from blast furnace plants blast furnace gas from Corex plants coal gas Corex gas from Corex gasifier chemical gases.

We claim:

1. A process for the direct reduction of sulfur- and iron-oxide-containing material comprising:

(a) subjecting to $CO_2$ scrubbing at least a partial volume of each of synthesis gas and top gas forming in the direct reduction of the iron-oxide-containing material;

(b) using said synthesis gas and said top gas as a reducing gas for direct reduction and for heating the iron-oxide-containing material to reduction temperature;

(c) generating $H_2S$ from the iron-oxide containing material during said heating and said direct reduction; and (d) feeding the generated $H_2S$ to the reducing gas along with the top gas.

2. A process according to claim 1, wherein a content of $H_2S$ ranging from 20 to 40 ppmV is adjusted in the reducing gas by means of the top gas.

3. A process according to claim 2, wherein the content of $H_2S$ is about 25 ppmV.

4. A process according to claim 1, wherein the $H_2S$ content in the reducing gas is effected by directly admixing to the reducing gas at least a partial volume of the top gas without $CO_2$, scrubbing.

5. A process according to claim 1, wherein reformed natural gas is employed as said synthesis gas and only a partial volume of the reformed natural gas is subjected to $CO_2$ scrubbing before being admixed to the reducing gas.

6. A process according to claim 4, wherein the adjustment of the $H_2S$ content in the reducing gas is effected by varying the wash-out degree of $CO_2$ scrubbing such that a portion of the $CO_2$ and hence a portion of the $H_2S$ remains in the scrubbed gas.

7. A process according to claim 1, wherein a sulfurous material is added to the iron-oxide-containing material.

8. A process according to claim 1, wherein the synthesis gas is at least one gas selected from the group consisting of: LD offgas, EAF offgas, blast furnace gas from blast furnace plants, coal gas, gas from gasifier, and chemical gases.

9. A plant for carrying out a process for the direct reduction of iron-oxide-containing material, comprising at least one direct reduction reactor for receiving, heating and reducing the iron-oxide-containing material, a synthesis-gas duct that is flow-connected with a reducing-gas supply duct leading to said direct reduction reactor and a top-gas discharge duct carrying off from said direct reduction reactor the top gas forming in direct reduction as well as in heating to reduction temperature, the top-gas discharge duct running into a $CO_2$ scrubber and being flow-connected with the reducing-gas supply duct by means of a top-gas bypass duct to avoid the $CO_2$ scrubber, wherein the synthesis-gas duct is flow-connected with the $CO_2$ scrubber and that the reducing gas formed of synthesis gas and of top gas is passed into the direct reduction reactor through the reducing-gas supply duct leading from the $CO_2$ scrubber to the direct reduction reactor.

10. A plant according to claim 9, further comprising a reformer for reforming natural gas and a reformed-gas duct departing from the reformer and joining the top-gas discharge duct for the production of synthesis gas, wherein both the reformed-gas duct and the top-gas discharge duct running into the $CO_2$ scrubber.

11. A plant according to claim 10, wherein the reformed-gas duct is flow-connected with the reducing-gas supply duct by means of a reformed-gas bypass duct avoiding the $CO_2$ scrubber.

12. A plant according to claim 11, wherein the bypass ducts are equipped with an adjustment valve capable of being activated via an $H_2S$ measuring means.

13. A plant according to claim 12, wherein the adjustment valve is a control valve.

* * * * *